US00RE46286E

(19) United States
(12) Reissued Patent
Armell et al.

(10) Patent Number: US RE46,286 E
(45) Date of Reissued Patent: Jan. 24, 2017

(54) DOWNHOLE MIXING TOOL

(71) Applicant: Servwell Engineering Limited, Dundee (GB)

(72) Inventors: Richard Alvin Armell, Montrose (GB); Ruairidh Andrew Cooper, Banchory (GB)

(73) Assignee: SERVWELL ENGINEERING LIMITED (GB)

(21) Appl. No.: 15/071,595

(22) Filed: Mar. 16, 2016

Related U.S. Patent Documents

Reissue of:
(64) Patent No.: 8,684,086
Issued: Apr. 1, 2014
Appl. No.: 13/159,764
Filed: Jun. 14, 2011

(30) Foreign Application Priority Data

Jun. 17, 2010 (GB) ..... GB1010192.1

(51) Int. Cl.

| | |
|---|---|
| ***E21B 27/00*** | (2006.01) |
| ***E21B 37/00*** | (2006.01) |
| ***E21B 43/12*** | (2006.01) |
| ***E21B 43/29*** | (2006.01) |
| ***B01F 3/12*** | (2006.01) |
| ***B01F 5/04*** | (2006.01) |

(52) U.S. Cl.
CPC ..... *E21B 43/124* (2013.01); *B01F 3/12* (2013.01); *B01F 5/0463* (2013.01); *E21B 43/29* (2013.01)

(58) Field of Classification Search
CPC ..... E21B 43/124; E21B 43/29; B01F 5/0463; B01F 3/12
USPC ..... 166/311, 312, 162, 167, 105, 105.4, 166/105.1, 68; 175/339
See application file for complete search history.

(56) References Cited

U.S. PATENT DOCUMENTS

| | | | | |
|---|---|---|---|---|
| 3,023,810 | A * | 3/1962 | Anderson | E21B 27/005 166/227 |
| 3,382,925 | A * | 5/1968 | Jennings | E21B 27/00 166/99 |
| 3,572,431 | A | 3/1971 | Hammon | |
| 4,190,113 | A * | 2/1980 | Harrison | 166/311 |
| 4,603,735 | A * | 8/1986 | Black | 166/68 |
| 4,744,420 | A * | 5/1988 | Patterson et al. | 166/312 |
| 5,033,545 | A * | 7/1991 | Sudol | 166/312 |
| 5,086,842 | A * | 2/1992 | Cholet | 166/312 |
| 5,269,384 | A * | 12/1993 | Cherrington | 175/53 |

(Continued)

FOREIGN PATENT DOCUMENTS

| | | |
|---|---|---|
| WO | WO2004/044370 | 5/2004 |
| WO | WO2010/138020 | 12/2010 |

*Primary Examiner* — Kenneth J Whittington
(74) *Attorney, Agent, or Firm* — Law Office of Jesse D. Lambert, LLC

(57) ABSTRACT

A downhole mixing tool and method for removing sand and other debris from a wellbore which combines the sand with a treatment fluid so that the sand is lifted to the surface of the well for removal. The tool includes a chamber into which the sand laden fluid is drawn and the treatment fluid is introduced. Ports into the chamber are arranged to provide a pressure drop to draw the sand laden fluid into the chamber and a mixing time within the chamber before sand laden fluid of lower viscosity exits the chamber to travel to the surface. Additional features include blades on the tool for breaking up obstructions prior to being drawn into the chamber and a lubricating line through the tool to introduce lubricating fluid to the blades.

18 Claims, 1 Drawing Sheet

(56) References Cited

U.S. PATENT DOCUMENTS

| | | | | |
|---|---|---|---|---|
| 5,295,537 | A * | 3/1994 | Trainer | 166/105.1 |
| 5,447,200 | A * | 9/1995 | Dedora et al. | 166/311 |
| 5,458,198 | A * | 10/1995 | Hashemi et al. | 166/312 |
| 6,152,218 | A * | 11/2000 | Safargar | 166/105.1 |
| 6,164,380 | A * | 12/2000 | Davis | 166/312 |
| 6,427,776 | B1 * | 8/2002 | Hoffman | E21B 23/04 166/167 |
| 6,497,290 | B1 * | 12/2002 | Misselbrook et al. | 166/384 |
| 6,640,904 | B2 * | 11/2003 | Hoffman et al. | 166/381 |
| 7,789,154 | B2 * | 9/2010 | Davis | E21B 21/103 166/222 |
| 7,905,291 | B2 * | 3/2011 | Kotsonis et al. | 166/311 |
| 7,975,765 | B2 * | 7/2011 | Manson | 166/312 |
| 8,016,040 | B2 * | 9/2011 | Ali et al. | 166/281 |
| 8,316,501 | B1 * | 11/2012 | Martini et al. | 15/104.061 |
| 8,672,025 | B2 * | 3/2014 | Wolf | E21B 37/00 166/312 |
| 2002/0139525 | A1 * | 10/2002 | Erick | E21B 17/203 166/68 |
| 2004/0079553 | A1 * | 4/2004 | Livingstone | 175/61 |
| 2006/0086507 | A1 * | 4/2006 | Surjaatmadja et al. | 166/312 |
| 2007/0272404 | A1 * | 11/2007 | Lynde | E21B 27/005 166/99 |
| 2009/0044953 | A1 * | 2/2009 | Sheth et al. | 166/369 |
| 2010/0288492 | A1 * | 11/2010 | Blackman | E21B 27/005 166/250.01 |
| 2011/0308804 | A1 * | 12/2011 | Armell et al. | 166/311 |

* cited by examiner

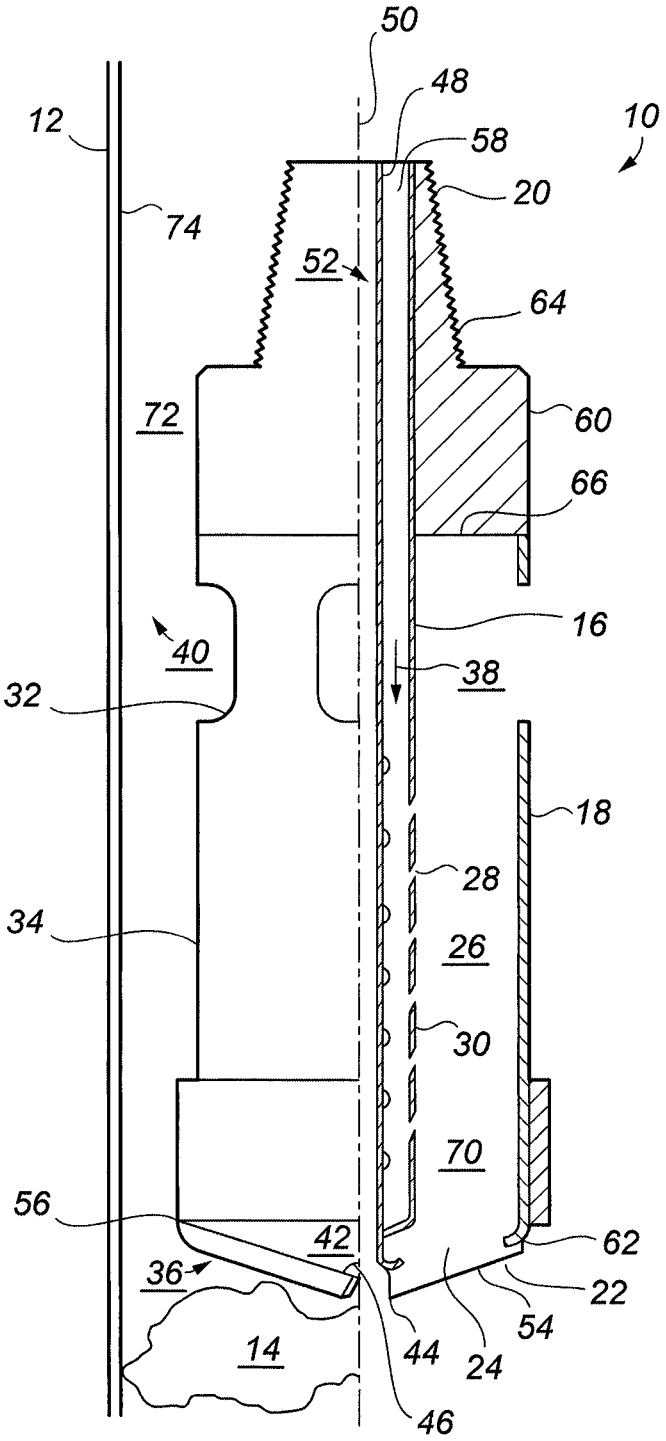
50
48
12
10
58
20
74
52
64
72
60
66
16
40
38
32
18
28
34
26
30
70
56
42
62
36
22
54
14
44
24
46

DOWNHOLE MIXING TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to a method and apparatus for removing sand and other debris from a wellbore and in particular, though not exclusively, to a downhole mixing tool which combines the sand with a treatment fluid so that the sand is lifted to the surface of the well for removal.

During production from an oil well, the oil fluid typically contains debris and foreign particles. Sand is a particular problem as it is swept out of the producing formation and the quantity found in the fluid can increase as oil production increases. Sufficient sand can build up in the wellbore to prevent efficient production.

Debris catchers have been developed which are run into the wellbore and filter sand and other debris from the fluid stream. The clean fluid is brought to the surface while the debris is held in a container. The main disadvantages with this approach are that the containers need to be emptied, requiring the tool to be pulled and run again; it is difficult to determine when a container is full so needless runs are made or no filtering is taking place; the filters can become blocked with debris; and the valves, which are typically used at an the entrance to the container, can also fail due to the build up of debris, thereby expelling the debris back into the wellbore as the tool is removed.

An alternative technique is to attempt to circulate the debris out of the wellbore. Fluid is pumped down a tubular string where upon it mixes with the sand and lifts it to the surface in the annulus between the string and the wall of the wellbore. This has been seen as inefficient as the circulating fluid is ineffectual at breaking up the sand and entraining it within the fluid. Additionally, due to the volume of debris suspended fluid which must be lifted in the annulus of a typical wellbore, insufficient annular velocity is available and the debris settles back out of the fluid.

SUMMARY OF THE INVENTION

It is an object of the present invention to provide a downhole mixing tool and a method of sand removal in a wellbore which obviates or mitigates at least some of the disadvantages in the prior art.

According to a first aspect of the present invention there is provided a downhole mixing tool for assisting in sand removal comprising first and second substantially tubular members with at least a portion of the first member being located in the second member; a first end for connection to a tubular string and a second end including one or more inlet ports accessing a chamber formed between the members; the first member including one or more treatment ports upon its surface; the second member including one or more outlet ports exiting the chamber to an outer surface of the tool; the ports being arranged so that fluid entering the inlet port mixes with treatment fluid introduced to the chamber through the treatment port and resides in the chamber until the treated fluid exits through the outlet port.

By introducing a treatment fluid to a debris laden fluid within a controlled environment, the treated fluid can have a reduced viscosity over the debris laden fluid and thus is carried to the surface of the well.

Advantageously, the tool does not require a container nor is the introduced fluid circulated out of the tool before being mixed with the sand.

Preferably, the second end is tapered. More preferably, the second end includes one or more blades. In this way, the tool can be used to cut into sand banks and other obstructions. Preferably each blade is located from an apex of the end towards an edge. Additionally an inlet port may be located relative to each blade, such that rotation of the tool causes the blades to sweep sand in through an inlet port.

The tool may include a third cylindrical member, the third cylindrical member being located through the tool, inside the first member. The third member may advantageously carry lubricating fluid to the second end to aid in breaking up obstructions. There may be one or more lubricating fluid exit ports arranged upon the second end.

Preferably there area plurality of treatment ports arranged circumferentially and longitudinally on the first member. More preferably the treatment ports are located towards the second end of the tool. In this way fluid entering the tool can immediately mix with the treatment fluid. The treatment ports are preferably arranged to direct the treatment fluid towards the first end. Preferably the treatment ports have an aperture which is smaller than the inlet ports. The ports may be arranged as nozzles to better disperse the treatment fluid into the sand laden fluid. In this way a venturi effect can be achieved at each treatment port within the chamber. This differential pressure effect assists in bringing the sand laden fluid into the chamber and in reducing the density of the treated fluid.

Preferably the second member includes a plurality of outlet ports arranged circumferentially around its outer surface. Preferably the outlet ports are substantially greater in aperture than the treatment ports. The outlet ports are preferably arranged towards the first end of the tool. Thus the treated fluid travels through the chamber prior to exiting the tool.

Preferably the members are arranged axially upon the tool. In this way, the chamber may be formed from the annulus between the first and second members. Preferably a radius of the first member is less than half a radius of the second member. In this way, the chamber has a significant width for holding treated fluid. Preferably, a first end of the annulus is sealed and a second end of the annulus is formed from the second end of the tool. In this way, the chamber is a sealed unit, having inlet ports at one end, outlet ports towards an opposing end and treatment ports upon an inner surface. By arranging the inlet and outlet ports at opposite ends of the chamber the fluid will have a residence time within the chamber. This time delay ensures a measured dosing of the treatment fluid is introduced to a known volume of the sand laden fluid.

According to a second aspect of the present invention there is provided a method for sand removal from a wellbore, the method comprising the steps:

a) directing sand laden fluid into a chamber of a tool located in a wellbore;
b) introducing treatment fluid to the sand laden fluid within the chamber to provide a treated fluid of lower viscosity;
c) retaining the treated fluid within the chamber for a period of time; and d) releasing the treated fluid from the tool to travel to the surface for removal of the sand.

In this way, production from the well is not interfered with. Additional runs to collect sand are not required.

Preferably the method includes the step of breaking up obstructions in the wellbore using the tool. In this way, the broken up sand and debris can advantageously be directed into the tool.

Preferably also the method is performed in coiled tubing. In this way the volume of treated sand laden fluid being lifted to the surface is reduced.

Preferably the method includes the step of creating a pressure differential inside the chamber to draw sand laden fluid into the chamber.

The method may also include the step of pumping a lubricating fluid through the tool to lubricate the tool for breaking up obstructions.

Preferably, the tool is according to the first aspect.

BRIEF DESCRIPTION OF THE DRAWING(S)

The invention will now be described, by way of example only, with reference to the accompanying drawing, FIG. 1, which is a part cross-sectional view through a sand removal tool according to an embodiment of the present invention.

DETAILED DESCRIPTION OF THE PREFERRED EMBODIMENT(S)

Referring to FIG. 1, there is illustrated a downhole mixing tool, generally indicated by reference numeral 10, located in a wellbore 12, to remove sand 14 there from, according to an embodiment of the present invention. The tool 10 includes first 16 and second 18 hollow cylinders, with the first cylinder 16 located inside the second cylinder 18; a first end 20 for connection to a tubular string (not shown) and a second end 22 including one or more inlet ports 24 accessing a chamber 26 formed between the cylinders 16,18; the first cylinder 16 including one or more treatment ports 28 upon its surface 30; the second cylinder 18 including one or more outlet ports 32 exiting the chamber 26 to an outer surface 34 of the tool 10; the ports 24,28,32 are arranged so that fluid 36 entering the inlet port 24 mixes with treatment fluid 38 introduced to the chamber 26 through the treatment port 28 and resides in the chamber 26 until the treated fluid 40 exits through the outlet port 32.

In more detail, the second end 22 is the leading end of the tool 10, and has a tapered surface 42, providing an apex 44. At the apex 44 is a lubrication port 46. A third cylinder 48 is arranged on the central axis 50 of the tool 10 and terminates at the port 46. While a single port 46 is shown it will be appreciated that a number of ports may be arranged on the surface 42, each fed from the line 48. Lubricator fluid 52 is pumped down the tube to deliver lubrication to the surface 42 and more particularly blades 54 arranged on the surface 42. There are three blades 54 equidistantly spaced around the surface 42, each extending from the apex 44 towards the outer edge 56 of the surface 42. At each blade 54, there is arranged an inlet port 24. The blade 54 effectively forms part of the perimeter of the port 24 with the remainder cut from the surface 42. An appreciable amount of the surface 42 is removed to provide large inlet ports 24.

Arranged coaxially to the third cylinder 48 is the first cylinder 16. Cylinder 16 provides an annulus 58 for the passage of treatment fluid 38 into the tool 10. On the outer surface 30 of the cylinder 16 there is located an array of treatment ports 28. The treatment ports 28 are arranged circumferentially and longitudinally on the surface 30 towards the second end 22 of the tool 10. Each port 28 is an aperture through the cylinder 16 and each is upwardly facing to direct the treatment fluid 38 towards the first end 20. The treatment ports 28 are appreciably smaller in size than the inlet ports 24.

Those in the art will appreciate that the ports 28 may be arranged as nozzles to better disperse the treatment fluid 38 into the sand laden fluid 36.

The second cylinder 18 is also located coaxially with the first 16 and third 48 cylinders. The second cylinder 18 forms the outer surface 34 of the tool 10. There are four outlet ports 32 arranged equidistantly around the circumference of the cylinder 18. The outlet ports 32 provide an aperture between the inside chamber 26 and the outer surface 34 of the tool 10. The outlet ports 32 are also appreciably greater in size than the treatment ports 28.

As the second cylinder 18 is the outermost part of the tool 10, it has top 60 and bottom 62 ends. The top end 60 forms a pin section 64 as is known in the art for connecting the tool in a tubing string (not shown). The top end 60 also provides an inner face 66 providing a seal between the first 16 and second 18 cylinders. The bottom end 62 forms the face 42 at the second end 22 and includes the inlet ports 24.

The coaxial arrangement of the cylinders 16,18 provide an annulus there between, and with the top 62 and bottom 64 ends a chamber 26 is created inside the tool 10. It is noted that the radius of the first cylinder 16 is less than half the radius of the second cylinder 18 which results in the chamber 26 having a significant width. The chamber 26 also extends over a majority of the length of the tool 10. The chamber 26 is an enclosed unit of a known volume. The chamber 26 has inlet ports 24 at one end 22, outlet ports 32 towards an opposing end 20 and treatment ports 28 upon an inner surface 30. The chamber 26 thus provides an annular pathway 70 arranged longitudinally through the tool 10.

In use, tool 10 is located on a tubing string, which may be coiled tubing and lowered into a wellbore. The well may be producing so that fluid in the form of oil is being carried to the surface by known means e.g. pumping. Alternatively, the producing well can be shut down so that this well servicing operation can be done. During production of the well sand and other debris collects in the wellbore 12 and can create blockages 14 such as sand banks.

During deployment the tool 10 does not need to interfere with production as the pathway 70 acts as a bypass through the tool 10 when no fluid is pumped through the inner cylinders 16,48. When the tool reaches an area of predicted fouling, pumps are turned on at surface to provide lubricating oil through the line 48 and treatment fluid 38 through the cylinder 16. Produced fluid 36 which is now laden with sand and other debris is directed into the tool 10, by the blades 54, as they are turned with rotation of the tool 10. The fluid 36 enters through the inlet ports 24 and arrives in chamber 26 following flow path 70.

Treatment fluid 38 is being dispersed into the chamber 26 through the treatment ports 28. Due to the size and direction of the ports 28, a venturi effect is created at the location of each of the ports 28 in the chamber 26. This effect reduces the pressure within the chamber 26 and consequently more debris laden fluid 36 is drawn into the chamber 26.

By knowing the volume of the chamber 26, the flow rate of the produced fluid 36 and the flow rate of the treatment fluid 38, controlled dosing of treatment fluid 38 on the produced fluid 36 can be achieved. Those skilled in the art will be aware of suitable treatment fluids which primarily lower the viscosity of the combined treated fluid mix 40 as compared to the debris laden fluid 36. Such fluids can operate by lowering their own viscosity in response to time, temperature, or pumping rate, for example. The chamber 26 is deliberately long with outlets 32 only at the far end 20. Thus pathway 70, which the fluid must take, both ensures sufficient treatment and a residency time in order to provide only a high percentage of treated fluid 40 with the reduced viscosity will exit the chamber 26. The treated fluid 40 exits the tool 10 through the ports 32 and travels to the surface of the well. The fluid 40 travels in the annulus 72, between the tubular string and the wall 74 of the wellbore 12. By utilising coiled tubing, annulus 72 is kept sufficiently small to allow successful lifting of the debris laden treated fluid 40 to surface for separation.

If the tool 10 encounters a blockage 14 such as a sandbank, the rotating blades 54 will cut through the sand 14, loosening it so that it becomes suspended in the production fluid 36. As detailed previously, the debris laden production fluid 36 is swept into the chamber 26 whereupon it is treated and carried to the surface. Where the blockage 14 is believed to be highly compacted, lubrication 52 can be provided to the blades 54 to prevent them from overheating and damaging the tool 10.

The principle advantage of the present invention is that it provides a downhole mixing tool which assists in lifting sand to the surface for separation without requiring filters, valves or multiple runs to retrieve sand from a container in the tool.

A further advantage of at least one embodiment of the present invention is that it provides a downhole mixing tool which effectively sucks in debris laden fluid for treatment by creating multiple venturi's within the tool.

A yet further advantage of at least one embodiment of the present invention is that it provides a downhole mixing tool which can break up blockages in the wellbore, prior to treating the components of the blockage and treating them for lifting to surface.

A still further advantage of at least one embodiment of the present invention is that it provides a downhole mixing tool which can be operated with a relatively small amount of treatment fluid as the treatment fluid is dispersed into the production fluid within a contained chamber having a residence time to ensure sufficient mixing.

Those skilled in the art will appreciate that various modifications may be made to the invention herein described without departing from the scope thereof. For example, while we have referred to 'top' and 'bottom' of the tool, this is entirely relative and the tool could be used in a wellbore of any deviation from the vertical. Additionally while we have described the downhole mixing tool for sand removal, it is suitable for both any component mixing downhole and the removal of any debris or other fouling of fluid in a wellbore. Though the treatment fluid is dispersed from a cylindrical body, the body need not lie coaxially with the axis of the tool, it may be off axis, or even be helically arranged to increase the available surface area for treatment ports. This applies to the lubricator line also.

We claim:

1. A downhole mixing tool for assisting in sand removal comprising first and second substantially tubular members with at least a portion of the first member being located in the second member *to create an annular chamber therebetween*; a first end for connection to a tubular string and a second end including one or more inlet ports [accessing a] *giving access to the annular* chamber formed between the members; the first member including a plurality of treatment ports arranged circumferentially and longitudinally upon its surface *and exiting into the annular chamber*; the second member including one or more outlet ports exiting the *annular* chamber to an outer surface of the tool; the ports being arranged so that *debris laden* fluid entering the inlet port mixes with treatment fluid introduced *directly* to the *annular* chamber through the treatment ports and resides in the *annular* chamber until the *debris laden* treated fluid exits through the outlet port *to surface*.

2. A downhole mixing tool according to claim 1 wherein the second end is tapered and includes one or more blades, each blade being located from an apex of the end towards an edge thereof.

3. A downhole mixing tool according to claim 2 wherein an inlet port is located relative to each blade.

4. A downhole mixing tool according to claim 1 wherein the tool includes a third cylindrical member, the third cylindrical member being located through the tool, inside the first member and further including one or more lubricating fluid exit ports arranged upon the second end.

5. A downhole mixing tool according to claim 1 wherein the treatment ports are located towards the second end of the tool.

6. A downhole mixing tool according to claim 1 wherein the treatment ports have an aperture which is smaller than the inlet ports.

[7. A downhole mixing tool according to claim 1 wherein the treatment ports are arranged as nozzles to better disperse the treatment fluid into the sand laden fluid.]

8. A downhole mixing tool according to claim 1 wherein the second member includes a plurality of outlet ports arranged circumferentially around its outer surface.

9. A downhole mixing tool according to claim 1 wherein the outlet ports are substantially greater in aperture than the treatment ports.

10. A downhole mixing tool according to claim 1 wherein the outlet ports are arranged towards the first end of the tool.

11. A downhole mixing tool according to claim 1 wherein the members are arranged axially upon the tool creating the *annular* chamber in the annulus between the first and second members.

12. A downhole mixing tool according to claim 11 wherein a first end of the annulus is sealed and a second end of the annulus is formed from the second end of the tool.

13. A downhole mixing tool according to claim 1 wherein a radius of the first member is less than half a radius of the second member.

14. A method for sand removal from a wellbore, the method comprising the steps:

a) directing sand laden fluid into a chamber of a tool located in a wellbore, the tool comprising first and second substantially tubular members with at least a portion of the first member being located in the second member *to create an annular chamber therebetween*; a first end for connection to a tubular string and a second end including one or more inlet ports [accessing the] *giving access to the annular* chamber formed between the members; the first member including a plurality of treatment ports arranged circumferentially and longitudinally upon its surface *and exiting into the annular chamber*; the second member including one or more outlet ports exiting the *annular* chamber to an outer surface of the tool; the ports being arranged so that *debris laden* fluid entering the inlet port mixes with treatment fluid introduced *directly* to the *annular* chamber through the treatment ports and resides in the *annular* chamber until the *debris laden* treated fluid exits through the outlet port;

b) introducing treatment fluid to the sand laden fluid within the chamber to provide a treated fluid of lower viscosity;

c) retaining the treated fluid within the chamber for a period of time; and d) releasing the treated fluid from the tool to travel to the surface for removal of the sand.

15. A method according to claim 14 wherein the method includes the step of breaking up obstructions in the wellbore using the tool.

16. A method according to claim 14 wherein the method is performed in coiled tubing.

17. A method according to claim 14 wherein the method includes the step of creating a pressure differential inside the chamber to draw sand laden fluid into the chamber.

18. A method according to claim 14 wherein the method includes the step of pumping a lubricating fluid through the tool to lubricate the tool for breaking up obstructions.

*19. A downhole mixing tool for assisting in sand removal comprising first and second substantially tubular members with at least a portion of the first member being located in the second member; a first end for connection to a tubular string and a second end including one or more inlet ports accessing a chamber formed between the members; the first member including a plurality of treatment ports arranged circumferentially and longitudinally upon its surface; the second member including one or more outlet ports exiting the chamber to an outer surface of the tool; the ports being arranged so that fluid entering the inlet port mixes with treatment fluid introduced to the chamber through the treatment ports and resides in the chamber until the treated fluid exits through the outlet port and wherein the tool includes a third cylindrical member, the third cylindrical member being located through the tool, inside the first member and further including one or more lubricating fluid exit ports arranged upon the second end.*

* * * * *